June 18, 1940.                J. H. FAUNCE                2,204,545
                         WELDING ELECTRODE HOLDER
                          Filed March 20, 1939
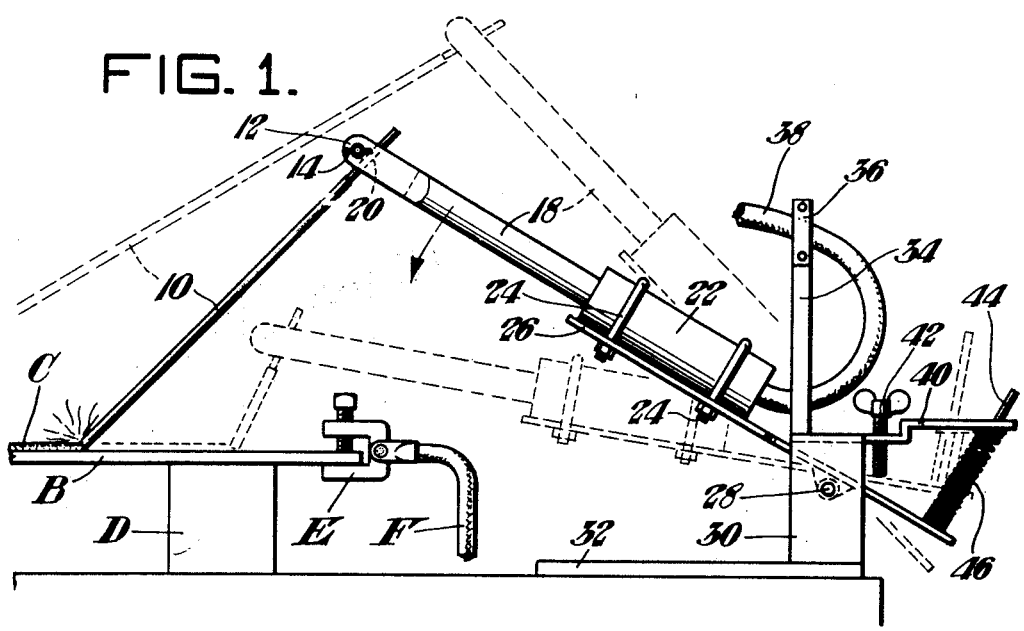
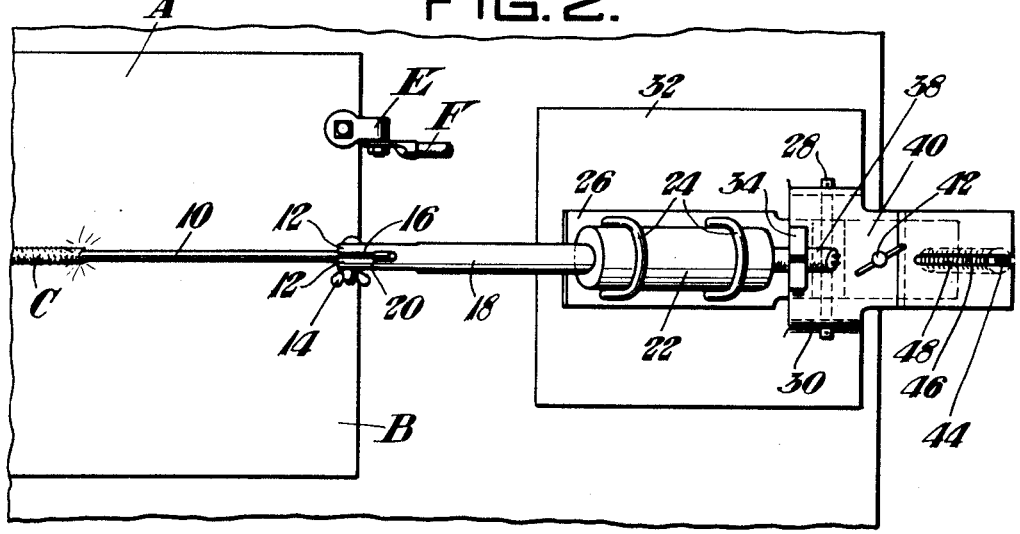
Inventor:
JOHN H. FAUNCE,
by John E Jackson
his Attorney.

Patented June 18, 1940

2,204,545

UNITED STATES PATENT OFFICE 2,204,545

WELDING ELECTRODE HOLDER

John H. Faunce, Johnstown, Pa.

Application March 20, 1939, Serial No. 262,998

3 Claims. (Cl. 219—8)

The present invention aims to provide an improved welding rod electrode holder of simple design and inexpensive construction so arranged that a single relatively unskilled workman can effectively make several welded joints on different workpieces.

The above and further features of the invention will be fully apparent from the following detailed disclosure and appended claims, when read in connection with the accompanying drawing, in which:

Figure 1 is a side elevation illustrative of a preferred embodiment of the invention; and Figure 2 is a plan view thereof.

Referring in detail to the drawing, A and B represent adjacent workpieces which are adapted to be united by a welded joint, such as indicated at C, the workpieces being supported on any suitable standards or fixtures D. A suitable conductor clamp E will connect with one of the workpieces and will in turn have associated therewith a conductor F which is either grounded or connected to a suitable source of welding current.

For effecting the weld between the workpieces in accordance with the present invention, the welding rod or electrode 10 is held during the welding operation by my improved holder, which is automatically effective to cause the welding rod or electrode to progress lengthwise along the joint at a rate corresponding to that at which the weld is completed.

The electrode rod may be of any suitable type such, for example, as one coated with a known welding flux. At its upper end the electrode will be clamped between the bifurcated jaws 12 by tightening a thumb screw 14. The jaws 12 are conveniently formed by cutting a longitudinal slot 16 at the extremity of a bar 18, which slot will open into a transversely drilled hole 20 of a diameter approximating that of the welding rod.

The lower end of the bar 18 is surrounded by a suitable insulator 22, and the assembled bar and insulator are secured by use of U-bolts 24 to a plate 26 which is pivotally mounted on a pintle rod 28 passing through aligned openings of the upstanding portions 30 of a supporting bracket 32. This bracket carries an upright 34 whose upper extremity is provided with a positioning opening 36 through which passes the conductor 38 for transmitting welding current from the welding generator to the electrode holder bar 18.

There is an outward extension 40 formed on the upper portion 30 of the bracket 32 which carries an adjustable thumb screw 42 effective to limit the pivotal movement of the plate 26.

Secured near the rear extremity of the plate 26 there is a spring positioning pin 44 surrounded by a light compression spring 46. The pin 44 is arranged to pass freely through an elongated slot 48 formed in the outward extension 40.

In operation, the weight of the electrode holder device will be sufficient to position it for proper coaction with the work to be welded. A welding rod of appropriate length will be fastened in the extremity of the holder bar 18 and the workpiece to be welded will be placed in position and grounded, as shown. The lower end of the welding electrode rod 10 will be contacted with the upper surface of the workpiece to be joined immediately over their line of abutment. As thus arranged, with the welding current turned on the coated electrode or welding rod will progressively melt, thus shortening the rod and permitting the weight of the parts to swing the plate 26 about its pivotal mounting 28. In this way the active end of the rod will automatically move along the weld. Long welds will take a relatively long electrode, and shorter welds will take a correspondingly short electrode. The relative position of a given welding electrode is suggested by the full and dotted line illustrations in Figure 1. The uppermost dotted position exemplifies the starting position of a long electrode. The full line position is representative of a position as the welded seam nears completion. The lowermost dotted position is representative of the position assumed by the electrode at about the time the seam is completed.

With the arrangement described, it will be appreciated that a single workman by the use of the plurality of devices such as shown may accomplish a plurality of welding operations, this only requiring that he set each device in proper position with the electrode holder rod centered or aligned with the line of abutment between the two pieces to be joined. Once the mechanism is properly set and the current turned on, the active or free end of the welding rod will automatically move along the joint and the setting of the stop screw 42 will be effective to stop the movement of the rod at any predetermined position. This stopping position can be readily predetermined by attaching a dummy rod in the holder before the current is turned on.

While I have described quite specifically the details of the embodiment of the invention illustrated, it is to be understood that various modifications may be made by those skilled in the art without departure from said invention, as defined in the appended claims.

I claim:-

1. Apparatus adapted to seam weld two pieces of metal to one another along their opposed edges, comprising a holder carrying a metal welding rod adapted to be melted away as the seam weld progresses, said holder being pivotally supported and carrying means for clamping the welding rod thereto at an oblique angle to said work pieces so that gravity alone is effective to progressively advance the rod along the line of weld as said weld rod melts away in forming the welded seam.

2. Apparatus constructed and arranged to unite two separate pieces of metal by a seam weld, said apparatus comprising a holder carrying a metal welding rod adapted to be melted away as the seam weld progresses, said holder being pivotally supported and carrying means for clamping the welding rod thereto at an oblique angle to said work pieces so that gravity alone is effective to progressively advance the rod along the line of weld as said rod melts away in forming the welded seam, means limiting the pivotal movement of said holder whereby by proper setting of the angle of the welding rod to the work and positioning of said limiting means, the length of weld can be predetermined.

3. Welding apparatus constructed and arranged to unite two separate pieces of metal along their opposed edges, said apparatus comprising a holder carrying a welding rod adapted to be melted away as the weld progresses, said holder being pivotally supported and carrying means for clamping the welding rod thereto at an oblique angle to said work pieces so that gravity alone is effective to progressively advance the rod along the line of weld as said rod melts away in forming the welded seam, and adjustable means controlling the pivotal movement of said holder, the arrangement being such that by proper setting of the angle of the welding rod and said adjustable means, the length of the seam weld can be predetermined.

JOHN H. FAUNCE.